United States Patent [19]

Kent

[11] Patent Number: 4,713,133

[45] Date of Patent: Dec. 15, 1987

[54] METHODS OF ADHERING A SELF-FUSING TAPE TO A SUBSTRATE

[75] Inventor: Eric G. Kent, Ontario, Canada

[73] Assignee: Polysar Limited, Sarnia, Canada

[21] Appl. No.: 893,809

[22] Filed: Aug. 6, 1986

Related U.S. Application Data

[63] Continuation-in-part of Ser. No. 768,110, Aug. 21, 1985, abandoned, and Ser. No. 768,111, Aug. 21, 1985, abandoned, each is a continuation-in-part of Ser. No. 636,719, Aug. 1, 1984, abandoned, which is a continuation-in-part of Ser. No. 465,174, Feb. 9, 1983, abandoned.

[30] Foreign Application Priority Data

Mar. 15, 1982 [CA] Canada .................................. 398,303

[51] Int. Cl.$^4$ .................... B32B 31/16; B32B 27/06; C08L 9/00; C08L 23/04
[52] U.S. Cl. ..................................... 156/162; 156/94; 156/187; 156/229; 156/307.7; 156/333; 156/331.2; 428/462; 428/517; 525/211; 525/222; 525/227; 525/233; 525/232; 525/240
[58] Field of Search .................... 428/462, 517; 156/94, 156/162, 187, 229, 307.7, 308.4, 331.2, 333, 334, 52; 525/211, 227, 233, 232, 240

[56] References Cited

U.S. PATENT DOCUMENTS

| | | |
|---|---|---|
| 2,164,981 | 10/1936 | Alderfer . |
| 2,569,540 | 10/1951 | Selby . |
| 2,569,541 | 10/1951 | Selby . |
| 2,656,297 | 10/1953 | Davis, Jr. et. al. . |
| 2,700,631 | 1/1955 | Ferguson et al. . |
| 2,830,919 | 4/1958 | Schatzel . |
| 2,894,925 | 7/1959 | Morris et al. . |
| 3,033,724 | 5/1962 | Stokes . |
| 3,050,497 | 8/1962 | Young . |
| 3,073,797 | 1/1963 | Fischer et al. . |
| 3,298,992 | 1/1967 | Bond et al. . |
| 3,503,911 | 3/1970 | Goldemberg et al. . |
| 3,558,762 | 1/1971 | Koehnlein et al. . |
| 3,740,127 | 6/1973 | Snell et al. . |
| 3,756,004 | 9/1973 | Gore . |
| 3,962,018 | 6/1976 | Costemalle et al. . |
| 4,022,728 | 5/1977 | Trotter et al. . |
| 4,130,453 | 12/1978 | Hollister . |
| 4,130,534 | 12/1978 | Coran et al. . |
| 4,156,703 | 5/1979 | Harrop . |
| 4,264,490 | 4/1981 | Berejka . |
| 4,268,334 | 5/1981 | Harris et al. . |
| 4,340,684 | 7/1982 | Bohm et al. . |
| 4,343,864 | 8/1982 | Berejka . |
| 4,497,936 | 2/1985 | Tancrede et al. . |
| 4,500,681 | 2/1985 | Shulman . |
| 4,536,445 | 8/1985 | Toy ....................................... 156/52 |
| 4,594,390 | 6/1986 | Sabet et al. ........................ 525/240 |

*Primary Examiner*—Jerome Massie
*Attorney, Agent, or Firm*—Stevens, Davis, Miller & Mosher

[57] ABSTRACT

A process is provided for affixing to a substrate a non-tacky, flexible layer consisting of a raw polymer mixture of a minor proportion of high density polyethylene, linear low density polyethylene or isotactic polypropylene and a major proportion of elastomeric polymer of which at least about 50 percent by weight is butyl rubber, by applying a stretching elongation to the flexible layer before application to the substrate. The process may be used in a wide variety of applications, for example, to cover metal parts, make repairs to cracked cover components and electrical wiring splicing and to repair leaks in pipes or hoses.

17 Claims, No Drawings

METHODS OF ADHERING A SELF-FUSING TAPE TO A SUBSTRATE

This is a continuation-in-part application of Ser. No. 768,110 filed Aug. 21, 1985 and Ser. No. 768,111 filed Aug. 21. 1985, both of which are continuation-in-part application of Ser. No. 636,719 filed Aug. 1, 1984, which is a continuation-in-part application of Ser. No. 465,174 filed Feb. 9, 1983, all now abandoned.

FIELD OF THE INVENTION

This invention relates to affixing a non-tacky, flexible layer in sheet or tape form to a substrate by applying a stretching elongation to the flexible layer before application to the substrate whereby adhesion to the substrate is obtained as well as self-bonding or fusion of overlapping layers.

BACKGROUND OF THE INVENTION

Many articles need to be coated for protection from the environment. For example, metal surfaces may be protected by covering with a coating layer, thereby preventing chemical, oxidative or other attack of the surface. The technology for the application of such coatings is well known and includes application from solution, by the application of a paint, or application as a thin sheet or tape. In the application of such coatings in the form of sheet or tape, a separate adhesive layer is generally used to achieve adhesion of the sheet to the substrate and of overlapping layers of the sheet to each other. In commercial wrapping operations, such as pipe wrapping, it is normal practice to use a sheet carrying such an adhesive layer, and to stretch the sheet slightly, up to about 5%, to ensure that it is wrapped tightly around the pipe.

In electrical applications such as cable splices, a tape in the form of a strip of flexible material is stretched, and wrapped, usually spirally around an electrical cable. The overlapping layers tend to fuse to one another so that they can no longer be separated readily. Earlier such tapes were based on natural rubber, whereas later tapes which are described in the literature are based on combinations of synthetic polymers U.S. Pat. No. 2,569,541 issued to Harold E. Selby discloses such compositions containing polyethylene, butyl rubber, polyethylene and a tackifier resin and requires that the proportion of butyl rubber be below 25 percent, and a tackifier is required to produce a composition which seals readily. U.S. Pat. No. 3,298,992 issued to H. M. Bond et al discloses tape compositions containing specific proportions of butyl rubber, polyisobutylene, a chlorinated hydrocarbon resin and a high styrene copolymer of butadiene and styrene. Generally these materials when formed into a roll without a liner adhere together or fuse so that after a short period of time it is impossible to unwind them. To avoid this problem, self-adhering tapes have been provided with a removable liner between overlapping layers. Removal of the liner is time consuming and may be difficult when it becomes tightly adhered to the tape.

DISCLOSURE AND PRACTICE OF INVENTION

The present invention is based on the discovery of compositions in sheet or tape form, which are not tacky and therefore do not stick together when overwrapped in the relaxed state but which fuse and produce a homogeneous body when subjected to a stretching elongation of at least about 50% and wrapped around a substrate. The compositions comprise raw polymer mixtures consisting of certain α-olefin polymers mixed in specific proportions with an elastomeric polymer component of which at least about 50 percent by weight is an isobutylene-isoprene polymer, the balance being polyisobutylene, an ethylene propylene polymer or natural rubber. They are strong but can be readily stretched without breaking. They have good ozone resistance and are readily handleable over a wide temperature range. The α-olefin polymers may be isotactic polypropylene or those polyethylenes which are generally referred to as low pressure polyethylene.

A further aspect of the invention is the surprising discovery that the presence of filler or pigment in the tape increases the rate of fusion of overlapping layers of the stretched, wrapped tape.

According to my discovery, there is provided a process for affixing to a substrate a flexible layer having insufficient tack to self-bond in the relaxed state, said layer consisting of a raw polymer mixture selected from the group consisting of (all parts being parts by weight) (a) a mixture of from about 15 to about 35 parts of a polymer of ethylene having a density of from about 0.945 to about 0.965 gm/cm$^3$ with from about 65 to about 85 parts of elastomeric polymer, (b) a mixture of from about 15 to about 30 parts of a linear low density polymer of ethylene having a density of from about 0.91 to about 0.94 gm/cm$^3$ with from about 70 to about 85 parts of elastomeric polymer, and (c) a mixture of from about 15 to about 25 parts of isotactic polypropylene with from about 75 to about 85 parts of elastomeric polymer, said raw polymer mixture optionally containing from about 0.5 to about 20 parts of one or more filler or pigment, said elastomeric polymer consisting of from about 50 to 100 parts by weight of an isobutylene-isoprene polymer and from 0 to about 50 parts by weight of one or more polymer selected from (i) natural rubber, (ii) a homopolymer of isobutylene having a molecular weight from about 50,000 to about 100,000 and (iii) a polymer of ethylene and propylene containing from about 50 to about 65 percent by weight ethylene, wherein said flexible layer is subjected to a stretching elongation of at least about 50% immediately prior to contact with the substrate, applying the elongated layer to the substrate in a wrapping operation and allowing overlapping layers of said flexible layer to bond to and fuse with each other.

Further according to my discovery, there is provided the process of affixing to a substrate a flexible layer having insufficient tack to self-bond in the relaxed state, said layer comprising a raw polymer mixture selected from the group consisting of (all parts being parts by weight) (a) a mixture of from about 15 to about 30 parts of linear low density polyethylene and from about 70 to about 85 parts of elastomeric polymer, and (b) a mixture of from about 15 to about 20 parts of isotactic polypropylene and from about 80 to about 85 parts of elastomeric polymer, said raw polymer mixtures (a) and (b) also containing from about 0.5 to about 20 parts by weight, per 100 parts of total polymer, of one or more filler or pigment, said elastomeric polymer consisting of from about 50 to 100 parts by weight of an isobutyleneisoprene polymer and from 0 to about 50 parts by weight of one or more polymers selected from (i) natural rubber and (ii) a homopolymer of isobutylene having a molecular weight of from about 50,000 to about 100,000, wherein said flexible layer is subjected to a stretching elongation of at least about 50 percent immediately prior to contact with the substrate, applying the elongated layer to the substrate in a wrapping operation and allowing overlapping layers of said flexible layer to bond to and fuse with each other.

The isobutylene-isoprene polymer may be selected from a polymer containing from about 97 to about 99.5 weight percent of isobutylene and from about 0.5 to about 3 weight percent of isoprene or from a polymer containing from about 0.5 to about 1.5 weight percent of chlorine or from about 1.5 to about 2.5 weight percent of bromine and from about 95 to about 99 weight percent of isobutylene and from about 0.5 to about 3 weight percent of isoprene. Such polymers are commercially available and have a molecular weight, expressed as the Mooney viscosity, of from about 30 to about 80 (ML 1+8 at 100° C.).

Polyisobutylene elastomer is available commercially as various molecular weight products. It is prepared using Friedel-Crafts catalysts at low temperature and its manufacture is well known in the art. Polyisobutylene preferred in the raw polymer mixture has a Staudinger molecular weight of from about 50,000 to about 100,000, especially from about 60,000 to about 80,000. Grades having higher molecular weights, for example about 120,000 to about 135,000, result in very strong tapes which are difficult to stretch and which do not fuse satisfactorily at room temperature when stretched and wrapped. On the other hand, very low molecular weight grades result in tapes which are tacky and difficult to handle.

Elastomeric copolymers of ethylene and propylene are well known to those skilled in the art and a variety are available commercially. Suitable such copolymers include EPR (ethylene-propylene rubber) and EPDM (ethylene-propylene-terpolymer) containing by weight from about 50 percent to about 65 percent ethylene. The third monomer which is used in a small amount in the production of EPDM is a copolymerizable polyene. Those which are generally used commercially are non-conjugated dienes including 5-ethylidene-2-norbornene, 1,4-hexadiene and cyclic dienes such as dicyclopentadiene.

The natural rubber is preferably selected from the commercially available SMR grades.

Polyethylene is a well-known article of commerce and a large number of grades are available. The old or conventional grades are produced by a high pressure process which operates at a pressure of from about 15,000 to 50,000 psi. The polymers produced in this process contain a variety of short and long chain branches and have densities falling in the range from about 0.91 to 0.94 gm/cm$^3$. In the newer or low pressure processes the polymer is produced either in gas phase fluidized bed reactors at pressures of about 100 to 300 psi or in liquid phase reactors. In these low pressure processes, the ethylene units polymerize in a linear fashion and randomly spaced short branches or side chains may be incorporated by copolymerizing small amounts, up to about 20 percent by weight, of α-olefins such as propylene, butene, hexene, octene and the like. The frequency and length of the side chains controls the density of the polymer. The low pressure processes are used in the production of products having densities ranging from about 0.91 to about 0.965 gm/cm$^3$. The term linear low density polyethylene (LLDPE) is commonly used, and when used herein is to be understood to mean the low pressure produced copolymers having a density in the range from 0.91 to 0.94 gm/cm$^3$. The term high density polyethylene (HDPE) is commonly used, and is used herein to describe polyethylene having a density of from about 0.945 to about 0.965 gm/cm$^3$. The polymers in the upper portion of the range are homopolymers of ethylene while those in the lower portion of the range are copolymers containing a small amount of another α-olefin. They generally range in molecular weight from about 100,000 to 500,000 with those in the range from about 100,000 to 300,000 being preferred. These polymers have been found to be useful in the practice of the invention, whereas the use of polyethylene produced at high pressure results in tapes which are weak and which tend to self-bond in the relaxed state. LLDPE is available commercially in grades covering a range of melt flow index, which is a measure of the viscosity under melt flow conditions. Those preferred in the practice of the present invention fall within the range from about 0.2 to about 5 according to ASTM-D-1238.

The polypropylene which can be used in the practice of the present invention is preferably highly crystalline in which propylene is polymerized predominantly in the isotactic configuration. It may also contain a small proportion, up to about 15 percent by weight, of the atactic configuration or of another copolymerized α-olefin such as butene, pentene, hexene, octene and the like. The term polypropylene is used herein to include homopolymers of propylene as well as such copolymers. A large number of grades of polypropylene are available commercially covering a wide range of melt flow index. The grades having a melt flow index according to ASTM-D-1238 of from about 2 to about 12 are preferred.

The relative proportions of thermoplastic polymer and elastomeric polymer used in the practice of the present invention fall within a narrow range. Expressed in parts per 100 of total polymer in the compositions, the proportion of high density polyethylene is from about 15 to about 35 parts, preferably from about 15 to about 30 parts. The proportion of linear low density polyethylene is from about 15 to about 30 parts, preferably from about 15 to about 25 parts. The proportion of polypropylene is from about 15 to about 25 parts, preferably from about 15 to about 20 parts. Proportions below the lower limits of the above ranges result in sheets or tapes having a level of tack which causes self adhesion of unstretched overlapping layers, whereas proportions higher than the upper limits result in sheets or tapes which do not fuse within a reasonable time at normal temperatures when stretched and wrapped in overlapping layers.

Filler or pigment may be included in the flexible layer if desired in an amount up to about 20 parts by weight, based on 100 parts of total polymer. They may be selected from those generally used in rubber compounds, exemplified by carbon black, calcium carbonate, talc, aluminum powder, titanium oxide and zinc oxide. The amount of a particular filler or pigment which can be used without adversely affecting the tensile and/or fusion properties of the flexible layer can be readily determined by those skilled in the art. It has surprisingly been found that carbon black and pigments, when present in the range from 5 to about 20 parts by weight, actually increase the rate of fusion of overlapping layers of stretched wrapped sheets or tapes. Thus when the higher levels of α-olefin polymer are used it is desirable to include carbon black or pigment in the compositions.

To achieve this effect it is preferred to use titanium oxide or carbon black, the preferred carbon black being a high abrasion or super abrasion furnace black. For electrical applications in which conductivity is desired, it is desirable to also use from about 10 to about 30 parts by weight per 100 parts of total polymers of an electrically conducting carbon black or metal powder, such as aluminum powder.

Other optional ingredients may be incorporated into the flexible layer to achieve various performance objectives. For example, there can be added antioxidants and stabilizers, processing aids, lubricants and fire retardants. The use of a separate tackifier is not required.

The flexible layer is prepared by mixing procedures well known in the art of processing of synthetic rubbers using either a two roll mill or an internal mixer. When using a two roll mill, the thermoplastic polymer is added to the mill which has been pre-heated to a suitable temperature generally in the range of about 150° to about 170° C. and mixed until it fluxes and forms a band on the mill rolls, which usually takes about two minutes. The elastomeric polymer(s) and any additives are then added to the mill and the mixing continued until a uniform blend is obtained, which usually takes a further five minutes. The mixture is taken off the mill as strips of compound. Compound may also be produced in bulk form using an internal mixer by adding the polymers in any order to a preheated mixer and mixing until a uniform compound is obtained, usually about five minutes. Sheets of the flexible layer may be prepared such as by passing the compound through a calendar or an extruder equipped with a sheet die. The thickness of the sheets is not critical but generally is from about 0.1 to about 5 mm. For most applications it is preferred to use sheets having a thickness of from about 0.3 to about 3 mm. The flexible layer may be used in sheet form although for a variety of applications it is desirably in the form of a tape produced by cutting the sheet to form tapes having the desired width.

The flexible layer, in sheet or tape form, is applied to the substrate by subjecting it to a stretching elongation in one direction of at least about 50% and in the elongated state applying it to the substrate, as for example in a wrapping action. Such stretching results in the sheets or tapes developing the ability to self-bond and the overlapping layers adhere strongly to each other. These layers have the appearance of a fused sheet on or covering the substrate within a few hours of application. In order to develop the self-bonding properties required, the flexible layer is elongated by at least about 50%. The upper limit of elongation depends on the composition of the particular sheet or tape and must be below the level which would cause rupture. Preferably, I have found that an elongation of from about 75% to about 150% provides an optimum balance between developing self-bonding properties and avoiding rupture.

The process of my invention may be used in a wide variety of applications such as splicing, encapsulation and connection. Metal parts can be readily covered with such a flexible layer for storage or environmental reasons; for example a metal pylon may be so covered to protect it when immersed in water. Minor repairs may be made to existing covers of exposed parts, for example underneath cars, trucks or other like vehicles. Damaged boots on tie rod ends or rack and pinion steering components may be readily repaired by covering with a flexible layer in accordance with this invention. The process may be used, particularly in the form of tapes, in the electrical trade for splicing cables, and for repairing splices and damaged insulation especially in cold weather environments.

The following examples illustrate the scope of my invention.

EXAMPLE 1

A compound was prepared by mixing butyl rubber, polyethylene and carbon black. A two roll rubber mill, with the rolls preheated to about 140° C., was used. High density polyethylene, grade 80060 supplied by Dow Chemical and having a density of 0.96 g/cm$^3$, was added to the mill rolls and mixed until it had melted and formed a band on the mill roll. The melting and banding of the polyethylene took about two minutes at which time the butyl rubber and carbon black were added and the mixing continued. A uniform mixture was formed after a total mixing time of seven minutes, when the compound was sheeted off the mill rolls and allowed to rest. 280 g of POLYSAR ®Butyl 111 supplied by Polysar Limited and containing about 99.3 weight percent of isobutylene and about 0.7 weight percent of isoprene and having a Mooney viscosity (ML 1+8 at 100° C.) of about 70, 70 g of polyethylene and about 10 g of carbon black, an SAF (N 110 type) was used.

The compound was then formed into sheet form as strips by feeding to a single screw extruder equipped with a sheet die, the extruder being operated at a temperature of about 175° C., to produce strips about 9 cm wide and about 1.5 mm thick.

EXAMPLE 2

A strip of flexible layer of Example 1 was used to repair the boot on the universal drive of a front wheel drive automobile. The boot is a molded article covering the universal drive to protect it from road dirt, etc. and replacement requires extensive dismantling of the wheel assembly. The boot was cracked and had a small tear at the point of the crack. The strip was elongated by about 75% and then applied over the boot in the region of the crack. It clung strongly to the boot and adhered to itself at points of overlap and within about twelve hours had formed a uniform surface completely sealing the crack.

EXAMPLE 3

Strips of the flexible compound of Example 1 were used to repair cracks in water hoses in an automobile and in a clothes washing machine by elongation by about 75 to 100% and application over the hose in the area of the crack. Water leakage from the crack stopped immediately on application of the flexible strips. Within about two hours of application, the applied strips had formed a uniform layer over the hose.

EXAMPLE 4

A metal pipe was wrapped with the flexible layer of Example 1. When a strip of the flexible layer was elongated by about 25% before application to the pipe, essentially no self-bonding was achieved. When a strip was elongated by about 50% and applied to the pipe, overlapping layers adhered to each other fairly strongly and slowly formed a uniform layer over the pipe. When a strip was elongated by about 100% and applied to the pipe, overlapping layers adhered strongly to each other and formed a uniform layer over the pipe within about twelve hours. Subsequent immersion of the covered pipe in water for about ten months caused no apparent deterioration of the flexible layer and the metal pipe was unaffected by the immersion in water.

EXAMPLE 5

Using a laboratory sized internal mixer, the compounds shown in Table 1 were prepared and then formed into strips about 2.5 cm wide and 1.5 mm thick. A strip of each compound was evaluated for covering a metal rod. Each strip was elongated by 75 to 100% and applied to the rod. Within about ten to twelve hours the applied strip had formed an essentially uniform layer.

EXAMPLE 6

Using the procedure of Example 5, the compounds shown in Table 1 were prepared and strips about 1.5 cm wide and 1.5 mm thick were produced. Electrical cable having an aluminum sheath which had been fractured was repaired by application of strips of each compound by elongation to about 75 to 80% before application. The characteristics of the aluminum sheath were restored essentially to those before the occurrence of the fracture.

TABLE 1

|  | Example 5 |  |  | Example 6 |  |
|---|---|---|---|---|---|
| Butyl polymer | 70 | 70 | 70 | 70 | 70 |
| Polyethylene | 30 | 30 | 30 | 30 | 30 |
| Antioxidant | 0.05 | 0.05 | 0.05 | 0.05 | — |
| Carbon black-1 | — | 3 | — | — | — |
| Carbon black-2 | — | — | — | 30 | — |
| Pigment | — | — | 3 | — | — |
| Calcium stearate | — | — | — | 2 | — |
| Aluminum powder | — | — | — | — | 20 |

Notes:
Butyl polymer as used in Example 1
Polyethylene as used in Example 1
Antioxidant - IRGANOX ® 1010
Carbon black-1 - N-110 type
Carbon black-2 - N-472 conducting type
Pigment - Pigment Orange 13

EXAMPLE 7

Sixty grams of each of six compounds of butyl rubber and several grades of high density polyethylene (HDPE) were prepared in a laboratory sized internal mixer in the relative proportions shown in Table 2 (parts by weight). The butyl rubber was POLYSAR Butyl 301 supplied by Polysar Limited and contained about 98.4 weight per cent of isobutylene and about 1.6 weight percent of isoprene and had a Mooney viscosity (ML 1+12 at 125° C.) of about 55. The internal mixer was preheated to about 160° C. and the polymers were added and mixed for about 5 minutes. The compound was then sheeted out on a rubber mill to a thickness of about 1.5 mm. A 0.6 centimeter strip cut from each sheet was elongated by 75 to 100% and wrapped around a metal rod. When examined after standing overnight, the overlapping layers were found to have fused so that the individual layers could not be separated. The tapes produced from compounds 2 and 5 had no tack in the unstretched state. Although the rest had very slight tack, when they were folded on themselves without stretching and the overlapping layers pressed together, they did not stick together.

TABLE 2

| Compound No. | 1 | 2 | 3 | 4 | 5 | 6 |
|---|---|---|---|---|---|---|
| Butyl rubber | 80 | 75 | 80 | 80 | 75 | 80 |
| HDPE 36056 (MI-0.36) | 20 | 25 | — | — | — | — |
| HDPE 69065 (MI-0.69) | — | — | 20 | — | — | — |
| HDPE 80060 (MI-0.80) | — | — | — | 20 | 25 | — |

TABLE 2-continued

| Compound No. | 1 | 2 | 3 | 4 | 5 | 6 |
|---|---|---|---|---|---|---|
| HDPE 05054 (MI-5) | — | — | — | — | — | 20 |
| Unstretched tack | * | Nil | * | * | Nil | * |

*Very Slight
Notes:
The various grades of HDPE were supplied by Dow Chemical.
MI is an abbreviation for Melt Index expressed in g/10 min. as determined by ASTM Method D-1238.

EXAMPLE 8

A compound containing 48 grams of brominated butyl rubber, 12 grams of Dow polyethylene 80060, 1.8 grams of carbon black and 0.03 grams of IGANOX 1010 was prepared and evaluated using the procedure of Example 7. The brominated butyl rubber contained about 96.1 weight percent of isobutylene, about 1.8 weight percent of isoprene and about 2.1 weight percent of bromine and had a Mooney viscosity (ML 1+4 at 125° C.) of about 52. The unstretched tape showed no significant tack. The wrapped elongated tape clung strongly to the rod and overlapping layers appeared to be fused to each other when examined after standing overnight.

EXAMPLE 9

Using the procedure of Example 7, the compounds shown in Table 3 were prepared and evaluated. None of the tapes had any unstretched tack except the one prepared from compounds 10 and 11 where tack was slight. After standing overnight, the overlapping layers of elongated, wrapped tapes had fused in all cases with the exception of the tape from compound 9. In this case the inner layers had fused and althought the outer layer stuck strongly, it could be separated.

TABLE 3

| Compound No. | 7 | 8 | 9 | 10 | 11 | 12 | 13 |
|---|---|---|---|---|---|---|---|
| Butyl rubber | 40 | 37.5 | 35 | 37.5 | 35 | 40 | 40 |
| Polyisobutylene | 40 | 37.5 | 35 | — | — | — | — |
| Natural Rubber | — | — | — | 37.5 | 35 | — | — |
| EPM 405 | — | — | — | — | — | 40 | — |
| EPDM 346 | — | — | — | — | — | — | 40 |
| Polyethylene | 20 | 25 | 30 | 25 | 30 | 20 | 20 |
| Unstretched tack | Nil | Nil | Nil | * | * | Nil | Nil |

*Very Slight
Notes:
Butyl rubber - as for Example 7
Polyisobutylene - Vistanex MML-80 supplied by Esso Chemical having a Mooney viscosity (ML 1+8 at 100° C.) of about 80 and Staudinger molecular weight of about 70,000.
EPM 405 - A copolymer of ethylene and propylene supplied by Polysar Limited having an ethylene content of 54%.
EPDM 346 - A copolymer of ethylene, propylene and ethylidene norbornene, containing about 63 percent by weight ethylene, supplied by Polysar Limited.
Polyethylene - Grade HDPE 80060 supplied by Dow Chemical.

EXAMPLE 10

The criticality of the ratio of butyl rubber to high density polyethylene, in the presence and absence of carbon black was evaluated by preparing and testing the following compounds. The first compound contained butyl 301 rubber and high density 80060 polyethylene in the ratio of 65:35. The second compound contained butyl 301 rubber and 80060 polyethylene in the ratio of 65:35 and 10 parts by weight per 100 parts by weight of total polymers of carbon black (N-330 type). The third compound contained butyl 301 rubber and 80060 polyethylene in the ratio of 65:35 and 20 parts by weight of carbon black. None of these compositions when elongated and wrapped exhibited any fusion.

EXAMPLE 11

Using the procedure of Example 7, the compounds shown in Table 4 containing linear low density polyethylene (LLDPE) were prepared and evaluated. Compounds No. 19 and 20, which are outside the scope of the invention, did not fuse subsequent to elongation and wrapping. Comparison of Compounds No. 16 and 18 show the effect of adding sufficient carbon black to affect the fusion.

TABLE 4

| Compound No. | 14 | 15 | 16 | Controls 17 | 18 | 19 | 20 |
|---|---|---|---|---|---|---|---|
| Butyl rubber | 80 | 75 | 70 | 90 | 70 | 65 | 40 |
| EPDM 585 | — | — | — | — | — | — | 40 |
| Polyethylene | 20 | 25 | 30 | 10 | 30 | 35 | 20 |
| IRB #4 carbon black | 3 | 3 | 3 | 3 | — | — | — |
| Carbon black | — | — | — | — | 10 | 10 | 10 |
| Antioxidant | 0.05 | 0.05 | 0.05 | 0.05 | 0.05 | 0.05 | 0.05 |
| Unstretched tack | * | * | Nil | ** | Nil | Nil | Nil |
| Fusion of wrapped tape | yes | yes | *** | yes | yes | no | no |

*Slight
**Moderate
***Partial
Notes:
Butyl rubber - POLYSAR Butyl 301
EPDM 585 - A copolymer of ethylene and propylene supplied by Polysar Limited having an ethylene content of 62%.
Polyethylene - Dowlex 2045, linear low density polyethylene supplied by Dow Chemical having a Melt Index of 1.0 in gm/10 min. as determined by ASTM Method D-1238 and a density of 0.92 as determined by ASTM Method D-792.
Antioxidant - IRGANOX ® 1010
Carbon black - N330 type

EXAMPLE 12

A compound containing 48 grams of butyl rubber and 12 grams of isotactic polypropylene was prepared and evaluated using the procedure of Example 7. Butyl 111 rubber was supplied by Polysar Limited and contained about 99.3 weight percent isobutylene and about 0.7 weight per cent of isoprene and had a Mooney viscosity (ML 1+8 at 100° C.) of about 70. The polypropylene, PROFAX ® 6524 was supplied by Hercules. Tapes were prepared from the compound as described in Example 1 and had slight surface tack in the relaxed state but when overlapped on each other and pressed together did not bond and could be readily separated. A strip was elongated by about 100% and wrapped around a metal rod. It clung tightly to the rod and overlapping layers adhered strongly to each other and after 24 hours the overlapping layer had fused.

EXAMPLE 13

Example 12 was repeated except that 15 grams of the polypropylene and 45 grams of the butyl rubber were used in preparing the compound. The unstretched tape had negligible tack, whereas overlapping layers of the elongated, wrapped tape self-bonded strongly. They could be unwound after 24 hours but required the application of significant force to do so.

EXAMPLE 14

Example 12 was repeated except that instead of butyl rubber, brominated butyl rubber was used containing about 96.1 weight percent of isobutylene, about 1.8 weight percent of isoprene and about 2.1 weight percent of bromine and having a Mooney viscosity (ML 1+4 at 125° C.) of about 52. The unstretched tape had no significant tack whereas the overlapping layers of the elongated, wrapped tape adhered fairly strongly to each other.

EXAMPLE 15

Using the procedure of Example 7, the compounds shown in Table 5 were prepared and evaluated. Butyl 301 rubber was as used in Example 7, the polypropylene was the same as used in Example 12 and the carbon black was an N330 type.

TABLE 5

| Compound No. | 21 | 22 | 23 | 24 |
|---|---|---|---|---|
| Butyl rubber | 80 | 75 | 75 | 70 |
| Polypropylene | 20 | 25 | 25 | 30 |
| Carbon black | 0 | 0 | 20 | 0 |
| Unstretched tack | slight | nil | nil | nil |
| Fusion | high | low | none | none |

These results show the critically of the amount of polypropylene which may be used in the invention, compounds No. 23 and 24 being outside the scope of the invention.

EXAMPLE 16

Using the procedure of Example 7, the compounds shown in Table 6 were prepared and evaluated. The tapes prepared from compounds 25 and 26 had slight unstretched tack but when folded on themselves and pressed together, overlapping layers could be separated without difficulty. On the other hand, tapes from compounds 27 and 28 were tacky and when similarly folded and pressed, overlapping layers tore when being separated. All stretched, wrapping tapes fused within a few hours.

TABLE 6

| Compound No. | 25 | 26 | Controls 27 | 28 |
|---|---|---|---|---|
| Butyl rubber | 85 | 85 | 90 | 90 |
| Shell PP5520 | 15 | — | 10 | — |
| Esso PP00400 | — | 15 | — | 10 |
| Carbon black | 3 | 3 | 3 | 3 |
| Stabilizer | 0.5 | 0.5 | 0.5 | 0.5 |
| Unstretched tack | slight | slight | tacky | tacky |

Notes:
Shell PP5520 and Esso PP00400 - isotactic polypropylene supplied by Shell Chemical and Esso Chemical, respectively.
Carbon black - N330 type
Stabilizer - IRGANOX ® 1010
Butyl rubber - as used in Example 7

EXAMPLE 17

Using the procedure of Example 7, the compounds shown in Table 7 wre prepared and evaluated. The butyl rubber was as used in Example 7 and the polypropylene was Profax 6524, as used in preivous examples. The eleongated, wrapped tapes prepared from all compounds had fused when examined after standing overnight.

TABLE 7

| Compound No. | 29 | 30 | 31 | 32 |
|---|---|---|---|---|
| Butyl rubber | 40 | 40 | 42.5 | 40 |
| Polyisobutylene | 40 | — | — | — |
| Natural rubber | — | 40 | — | — |
| EPDM 585 | — | — | 42.5 | — |
| EPDM 346 | — | — | — | 40 |
| Polypropylene | 20 | 20 | 15 | 20 |
| Carbon black | — | — | 3.0 | — |

TABLE 7-continued

| Compound No. | 29 | 30 | 31 | 32 |
|---|---|---|---|---|
| Antioxidant | — | — | 0.05 | — |
| Unstretched tack | nil | very slight | slight | nil |

Notes:
EPDM 585 - A copolymer of ethylene, propylene and ethylidene norbornene containing about 62% by weight ethylene, and supplied by Polysar Limited.
EPDM 346 - As used in Example 9
Carbon black - N330 type
Antioxidant - IRGANOX ® 1010

What is claimed is:

1. The process of affixing to a substrate a flexible layer having insufficient tack to self-bond in the relaxed state, said layer consisting of a raw polymer mixture selected from the group consisting of (all parts being parts by weight) (a) a mixture of from about 15 to about 30 parts of a polymer of ethylene having a density of from about 0.945 to about 0.965 gm/cm$^3$ with from about 70 to about 85 parts of elastomeric polymer, (b) a mixture of from about 15 to about 30 parts of a linear low density polymer of ethylene having a density of from about 0.91 to about 0.94 gm/cm$^3$ with from about 70 to about 85 parts of elastomeric polymer, and (c) a mixture of from about 15 to about 25 parts of isotactic polypropylene with from about 75 to about 85 parts of elastomeric polymer, said elastomeric polymer consisting of from about 50 to 100 parts by weight of an isobutylene-isoprene polymer and from 0 to about 50 parts by weight of one or more polymers selected from (i) natural rubber, and (ii) homopolymer of isobutylene having a molecular weight from about 50,000 to about 100,000, wherein said flexible layer is subjected to a stretching elongation of at least about 50% immediately prior to contact with the substrate, applying the elongated layer to the substrate in a wrapping operation and allowing overlapping layers of said flexible layer to bond to and fuse with each other.

2. The process of claim 1 wherein said isobutyleneisoprene polymer is selected from (a) a copolymer containing from about 97 to about 99.5 weight percent of isobutylene and from about 0.5 to about 3 weight percent of isoprene and (b) a copolymer containing from about 95 to about 99 weight percent of isobutylene, from about 0.5 to about 2 weight percent of isoprene and from about 0.5 to about 1.5 weight percent of chlorine or from about 1 to about 3 weight percent of bromine.

3. The process of claim 1 wherein said homopolymer of isobutylene has a molecular weight from about 60,000 to about 80,000.

4. The process of claim 1 wherein said polymer of ethylene and propylene is a copolymer of ethylene, propylene and ethylidene norbornene.

5. The process of claim 2 wherein said isobutyleneisoprene polymer has a Mooney viscosity (ML 1+8 at 100° C.) of from about 30 to about 80.

6. The process of claim 2 wherein the stretching elongation is from about 75 percent to about 150 percent.

7. The process of affixing to a substrate a flexible layer having insufficient tack to self-bond in the relaxed state, said layer consisting of a raw polymer mixture selected from the group consisting of (all parts being parts by weight) (a) a mixture of from about 15 to about 30 parts of a polymer of ethylene having a density of from about 0.945 to about 0.965 gm/cm$^3$ with from about 70 to about 85 parts of elastomeric polymer, (b) a mixture of from about 15 to about 30 parts of a linear low density polymer of ethylene having a density of from about 0.91 to about 0.94 gm/cm$^3$ with from about 70 to about 85 parts of elastomeric polymer, and (c) a mixture of from about 15 to about 20 parts of isotactic polypropylene with from about 80 to about 85 parts of elastomeric polymer, said raw polymer mixture also containing from about 0.5 to about 20 parts by weight of one or more filler or pigment, said elastomeric polymer consisting of from about 50 to 100 parts by weight of an isobutylene-isoprene polymer and from 0 to about 50 parts by weight of one or more polymers selected from (i) natural rubber and (ii) homopolymer of isobutylene having a molecular weight of from about 50,000 to about 100,000, wherein said flexible layer is subjected to a stretching elongation of at least about 50% immediately prior to contact with the substrate, applying the elongated layer to the substrate in a wrapping operation and allowing overlapping layers of said flexible layer to bond to and fuse with each other.

8. The process of claim 7 wherein said isobutyleneisoprene polymer is selected from (a) a copolymer containing from about 97 to about 99.5 weight percent of isobutylene and from about 0.5 to about 3 weight percent of isoprene and (b) a copolymer containing from about 95 to about 99 weight percent of isobutylene, from about 0.5 to about 2 weight percent of isoprene and from about 0.5 to about 1.5 weight percent of chlorine or from about 1 to about 3 weight percent of bromine, said isobutyleneisoprene polymer having a Mooney viscosity (ML 1+8 at 100° C.) of from about 30 to about 80.

9. The process of claim 8 wherein the stretching elongation is from about 75 percent to about 150 percent.

10. The process of claim 7 wherein said mixture contains from about 5 to about 20 parts by weight based on total polymer of carbon black or titanium dioxide.

11. The process of affixing to a substrate a flexible layer having insufficient tack to self-bond in the relaxed state, said layer consisting of a raw polymer mixture selected from the group consisting of (all parts being parts by weight) (a) a mixture of from about 15 to about 30 parts of a polymer of ethylene having a density of from about 0.945 to about 0.965 gm/cm$^3$ with from about 70 to about 85 parts of elastomeric polymer, (b) a mixture of from about 15 to about 25 parts of a linear lower low density polymer of ethylene having a density of from about 0.91 to about 0.94 gm/cm$^3$ with from about 75 to about 85 parts of elastomeric polymer, and (c) a mixture of from about 15 to about 20 parts of isotactic polypropylene with from about 80 to about 85 parts of elastomeric polymer, said raw polymer mixture also containing from about 5 to about 20 parts of filler selected from carbon black and tiatanium dioxide, said elastomeric polymer consisting of from about 5 to 100 parts by weight of isobutylene-isoprene polymer and from about 0 to about 50 parts by weight of one or more polymers selected from (i) natural rubber and (ii) a homopolymer of isobutylene having a molecular weight from about 50,000 to about 100,000 wherein said flexible layer is subjected to a stretching elongation of at least about 50% immediately prior to contact with the substrate, applying the elongated layer to the substrate in a wrapping operation and allowing overlapping layers of said flexible layer to bond to and fuse with each other.

12. The process of claim 11 wherein said isobutyleneisoprene polymer is selected from (a) a copolymer containing from about 97 to about 99.5 weight percent of isobutylene and from about 0.5 to about 3 weight percent of isoprene and (b) a copolymer containing from about 95 to about 99 weight percent of isobutylene, from about 0.5 to about 2 weight percent of isoprene and from aobut 0.5 to about 1.5 weight percent of chlorine or from about 1 to about 3 weight percent of bromine, said isobutyleneisoprene polymer having a Mooney viscosity (ML1+8 at 100° C.) of from about 30 to about 80.

13. The process of claim 11 wherein said stretching elongation is from about 75 to about 150 percent.

14. The process of affixing to a substrate a flexible layer having insufficient tack to self-bond in the relaxed state, said layer consisting of a raw polymer mixture selected from the group consisting of (all parts being parts by weight) (a) a mixture of from about 15 to about 30 parts of a polymer of ethylene having a density of from about 0.945 to about 0.965 gm/cm$^3$ with from about 70 to about 85 parts of elastomeric polymer, (b) a mixture of from about 15 about 15 to about 30 parts of a linear low density polymer of ethylene having a density of from about 0.91 to about 0.94 gm/cm$^3$ with from about 70 to about 85 parts of elastomeric polymer, and (c) a mixture of from about 15 to about 25 parts of isotactic polypropylene with from about 75 to about 85 parts of elastomeric polymer, said elastomeric polymer consisting of from about 50 to 100 parts by weight of an isobutylene-isoprene polymer and from 0 to about 50 parts by weight of a polymer of ethylene and propylene containing from about 50 to about 65 percent by weight ethylene, wherein said flexible layer is subjected to a stretching elongation of at least about 50% immediately prior to contact with the substrate, applying the elongated layer to the substrate in a wrapping operation and allowing overlapping layers of said flexible layer to bond to and fuse with each other.

15. The process of claim 14 wherein said isobutylene-isoprene polymer is selected from (a) a copolymer containing from about 97 to about 99.5 weight percent of isobutylene and from about 0.5 to about 3 weight percent of isoprene and (b) a copolymer containing from about 95 to about 99 weight percent of isobutylene, from about 0.5 to about 2 weight percent of isoprene and from about 0.5 to about 1.5 weight percent of chlorine or from about 1 to about 3 weight percent of bromine.

16. The process of claim 15 wherein said isobutylene-isoprene polymer has a Mooney viscosity (ML1+8 at 100° C.) of from about 30 to about 80.

17. The process of claim 16 wherein said polymer of ethylene and propylene is a copolymer of ethylene, propylene and ethylidene norbornene.

* * * * *